US006731463B2

United States Patent
Gates et al.

(10) Patent No.: US 6,731,463 B2
(45) Date of Patent: May 4, 2004

(54) WAFER FABRICATION FOR THERMAL POLE TIP EXPANSION/RECESSION COMPENSATION

(75) Inventors: Jane Katherine Gates, Minnetonka, MN (US); Youping Mei, Eden Prairie, MN (US); James Richard Peterson, Eden Prairie, MN (US); Lance Eugene Stover, Eden Prairie, MN (US); Zine Eddine Boutaghou, Vadnais Heights, MN (US); Wayne Allen Bonin, North Oaks, MN (US); Jason Wayne Riddering, Prior Lake, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 89 days.

(21) Appl. No.: 10/041,357

(22) Filed: Jan. 8, 2002

(65) Prior Publication Data

US 2002/0145829 A1 Oct. 10, 2002

Related U.S. Application Data

(60) Provisional application No. 60/281,497, filed on Apr. 4, 2001.

(51) Int. Cl.$^7$ .................................................. G11B 5/60
(52) U.S. Cl. .............................. 360/235.7; 360/235.8; 360/236.3; 360/236.2
(58) Field of Search ......................... 360/235.7, 235.8, 360/236.3

(56) References Cited

U.S. PATENT DOCUMENTS 6,424,493 B1 * 7/2002 Matsumoto et al. ..... 360/236.3

* cited by examiner

*Primary Examiner*—Robert S. Tupper

(57) ABSTRACT

The slider and method of the present invention relate to a slider for a disc drive. The slider includes a substrate having a cavity and a filler within the cavity. The slider further includes a transducer that is positioned near the filler. The design facilitates controlling the relative thermal expansion between the transducer and substrate of the slider that is near the transducer. Compensating for the thermal expansion of the transducer provides a more consistent fly height of the slider during operation of the disc drive. In addition, the design adjusts the air-bearing surface of the slider such that the transducer does not extend below the rest of the slider as the transducer expands.

21 Claims, 5 Drawing Sheets

WAFER FABRICATION FOR THERMAL POLE TIP EXPANSION/RECESSION COMPENSATION

RELATED APPLICATION

This application claims the benefit of U.S. Provisional Application Serial No. 60/281,497, filed Apr. 4, 2001 under 35 USC 119(e).

FIELD OF THE INVENTION

The present invention relates to the field of mass storage devices. More particularly, this invention relates to a disc drive that includes a slider, which is designed to maintain the fly height of the slider even though portions of the slider thermally expand during operation of the disc drive.

BACKGROUND OF THE INVENTION

One of the key components of any computer system is a place to store data. Computer systems have many different places where data can be stored. One common place for storing massive amounts of data in a computer system is on a disc. The basic parts of any disc storage system are a disc that is rotated, an actuator that moves a transducer to various locations on or over the disc, and electrical circuitry that is used to write and read data to and from the disc. A typical disc storage system includes a microprocessor that controls most of the operations of the system. The microprocessor utilizes circuitry to encode data so that it can be successfully retrieved from and written to a medium on the disc.

A typical transducer translates electrical signals into magnetic field signals that actually record the data. The transducer is usually housed within a small ceramic block called a slider. The slider is passed over the rotating disc in close proximity to the disc. The transducer is used to read data from the disc or write information representing data to the disc.

The discs within conventional disc drives usually spin at relatively high revolutions per minute (RPM). A typical rotational speed is 7200 RPM but some high-performance disc drives rotate as fast as 10,000 RPM.

Sliders are aerodynamically designed to fly on a cushion of air that is generated due to rotating the discs at such high speeds. The slider has an air-bearing surface (ABS) that includes rails and a cavity or depression between the rails. The air-bearing surface is that surface of the slider nearest to the disc as the disc drive is operating. Air is dragged between the rails and the disc surface causing an increase in pressure that tends to force the head away from the disc. Air is simultaneously rushing past the cavity or depression in the air-bearing surface which produces a lower than ambient pressure area at the cavity or depression. The low-pressure area near the cavity counteracts the higher pressure at the rails. These opposing forces equilibrate so the slider flies over the surface of the disc at a particular fly height. The fly height is the distance between the disc surface and the transducing head. This distance is the thickness of an air lubrication film. This film minimizes the friction and resulting wear that would occur if the transducing head and disc were in mechanical contact during disc rotation.

Information that is in the form of data is stored on the surface of the discs. The data is divided or grouped together on the discs in certain portions or tracks on the discs. In some disc drives the tracks are a multiplicity of concentric circular tracks. Disc drive systems are configured to read and write information that is stored on the discs in one or more of the tracks.

The transducers are in the form of read/write heads that are attached to the sliders. One transducer is typically located on each side of a storage disc. The transducers read and write information to/from the storage discs when the transducers are accurately positioned over one of the designated tracks on the surfaces of the storage discs. As the storage discs spin, the appropriate read/write head is accurately positioned above the target track where the read/write head is able to store data onto a track by writing information representative of data onto the one of the discs. Similarly, reading data on a storage disc is accomplished by positioning a read/write head above the proper track, and reading the stored material from one of the storage discs.

In order to write on (or read from) different tracks, the read/write head is moved radially across the tracks on the disc to a designated target track. Servo feedback information is used to accurately locate the transducer. The disc drive control system moves the actuator assembly to the appropriate position using the servo information. The servo information is also used to hold the transducer in a steady position during a read or write operation.

The best performance of the disc drive results when a slider is flown as closely to the surface of a disc as possible. During operation of a disc drive, the distance between the slider and the disc is very small. Currently fly heights are about 0.5 micro-inches. It is contemplated that smaller fly heights will be achieved in the future since this is one factor in achieving increased recording density.

The constant demand for increasing hard drive recording density has resulted in a drastic decrease in fly height over the years. Variation in the fly height is an increasing source of problems due to head/media intermittent contact, especially at less than 0.5 micro-inch fly height. Intermittent contact induces vibrations that are detrimental to the reading/writing quality at such low fly height and may also eventually result in a head crash that causes the loss of data.

The slider body is typically formed from a ceramic wafer. The transducers are built on the wafer using conventional semiconductor processing techniques. The transducers are then encapsulated in an overcoat such as alumina. The wafer is sliced to form rows of individual heads and subsequently lapped to an appropriate dimension and surface finish. The individual heads are then diced from the rows to form individual sliders.

The interface between the alumina and the substrate typically includes the closest point between the slider and the disc when the slider is passing over the surface of the disc in transducing relation. As a result, if there is any variation in the fly height, this closest point is a likely contact point between the slider and the disc.

One source of variation in the fly height results from the differences in thermal expansion between the ceramic substrate and the transducer during operation of the disc drive. Due to intrinsic properties, the ceramic substrate and the transducer expand at different rates as the slider heats up. The differences in expansion cause the transducer to move closer to the disc surface than the substrate that is near the transducer. This change in spacing can affect the fly height of the slider. The varying fly height can cause poor disc drive performance during reading and writing operations. In addition, if the fly height becomes too small, there is likely to be contact between the slider and the disc during operation of the disc drive.

Therefore, what is needed is a slider that is capable of operating at low fly heights. In addition, there is a need for design that compensates for the differences in thermal expansion between the different parts in a slider. The resulting slider would be less sensitive to temperature variations during operation of the disc drive such that the disc drive operates in a more consistent manner.

SUMMARY OF THE INVENTION

The present invention relates to a slider for a disc drive. The slider includes a substrate having a cavity and a filler within the cavity. The slider further includes a transducer that is positioned near the filler. The invention includes the slider as well as the slider in combination with the disc drive.

The present invention also relates to a method of fabricating a slider. The method includes providing a substrate and forming a cavity in the substrate. The cavity is filled with a filler and a transducer is formed on the slider such that the transducer is positioned near the filler.

The slider and method of the present invention both include, or form, a cavity within a substrate. The filler material within the cavity has similar thermomechanical properties as the material of the transducer and/or the material of a layer that encapsulates the transducer. The design facilitates controlling the relative thermal expansion between the transducer and substrate of the slider. A center rail that includes the transducer may be formed on the slider such that the center rail includes a portion of the filler and a portion of the layer that encapsulates the transducer.

Compensating for, or minimizing, the thermal expansion of the transducer and the ceramic substrate provides a more consistent fly height of the slider during operation of the disc drive. In addition, the design adjusts the air-bearing surface of the slider such that the transducer does not extend below the rest of the slider as the transducer expands. The result is more consistent read and write performance characteristics amongst the heads in a disc drive as well as a design that is less sensitive to the differences in thermal expansion that exist between the substrate and the transducer of the slider and therefore is more robust to changes in ambient temperature.

DESCRIPTION OF THE PREFERRED EMBODIMENT

In the following detailed description of the preferred embodiments, reference is made to the accompanying drawings that form a part hereof, and in which are shown by way of illustration specific embodiments in which the invention may be practiced. It is to be understood that other embodiments may be utilized and structural changes may be made without departing from the scope of the present invention.

The invention described in this application is useful with all mechanical configurations of disc drives having either rotary or linear actuation. In addition, the invention is also useful in all types of disc drives including hard disc drives, zip drives, floppy disc drives and any other type of drives where unloading the transducer from a surface and parking the transducer may be desirable.

Figure 1:
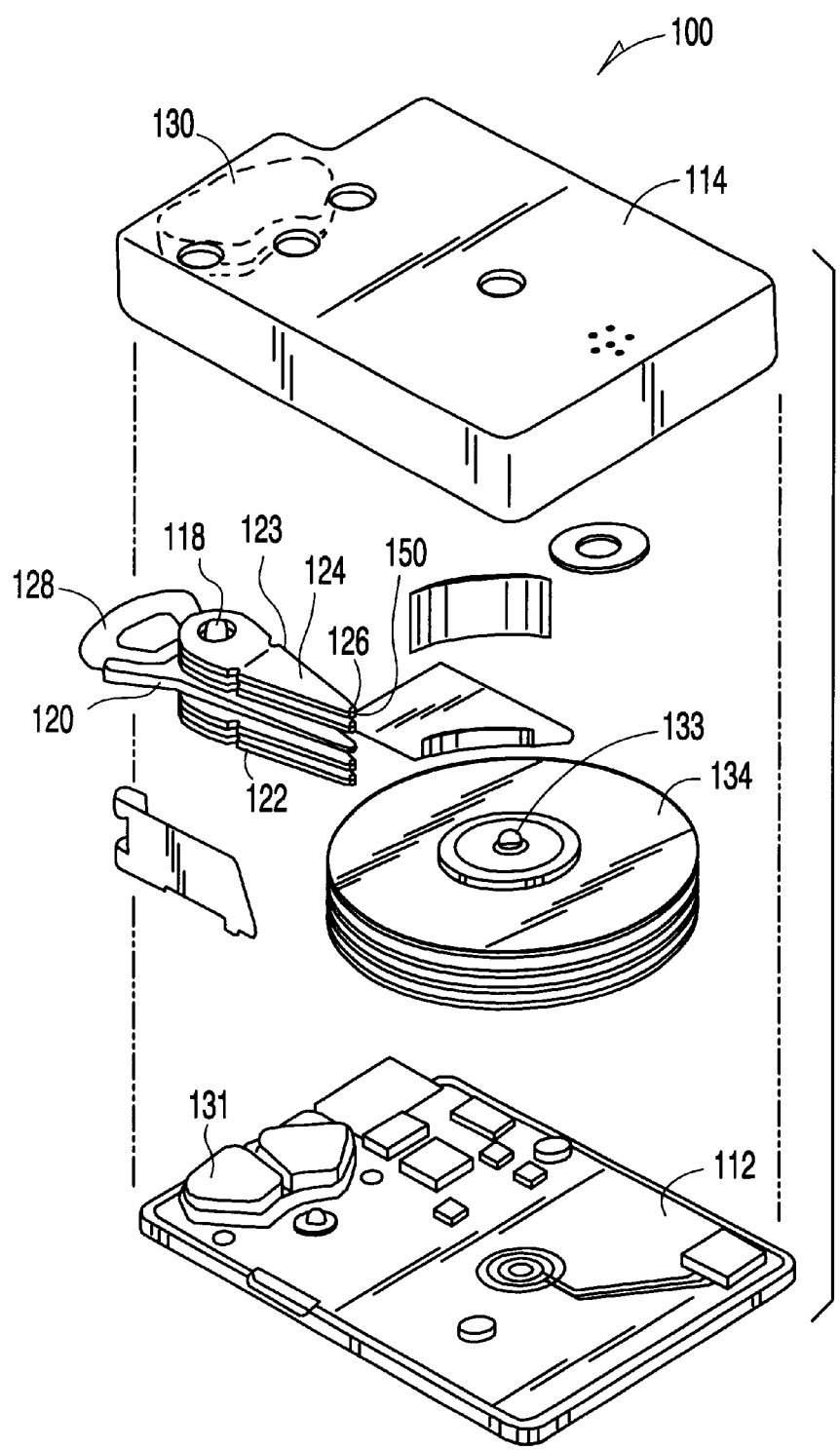
FIG. 1 is an exploded view of a disc drive with a multiple disc stack.

FIG. 1 is an exploded view of a disc drive 100 that includes a rotary actuator. The disc drive 100 includes a base 112 and a cover 114. The base 112 and the cover 114 form a disc enclosure. An actuator assembly 120 is rotatably attached to the base 112 by an actuator shaft 118. The actuator assembly 120 includes a comb-like structure 122 having a plurality of arms 123. There are load beams or load springs 124 attached to the individual arms 123 on the comb 122. A slider 126 is attached at the end of each load spring 124. The slider 126 carries a magnetic transducer 150 to form what is typically called the head. It should be noted that the slider may have one transducer 150, although the invention is equally applicable to sliders having more than one transducer.

A voice coil 128 is attached at the end of the actuator arm assembly 120 that is opposite to the load springs 124 and the sliders 126. Attached within the base 112 is a pair of magnets 130 and 131. The pair of magnets 130 and 131 and the voice coil 128 are the key components of a voice coil motor which applies a force to the actuator assembly 120 to rotate it about the actuator shaft 118. Moving the actuator assembly 120 maneuvers all of the load springs 124 in unison.

A spindle motor is mounted to the base 112. The spindle motor includes a rotating portion called a spindle hub 133. In this particular disc drive, the spindle motor is within the spindle hub 133. The disc drive 100 illustrated in FIG. 1 includes a number of discs 134 are attached to the spindle hub 133 such that the spindle motor rotates each of the discs 134. It should be noted that in other disc drives a single disc or a different number of discs may be attached to the hub. The invention described herein is equally applicable to such other disc drives.

Figure 2:
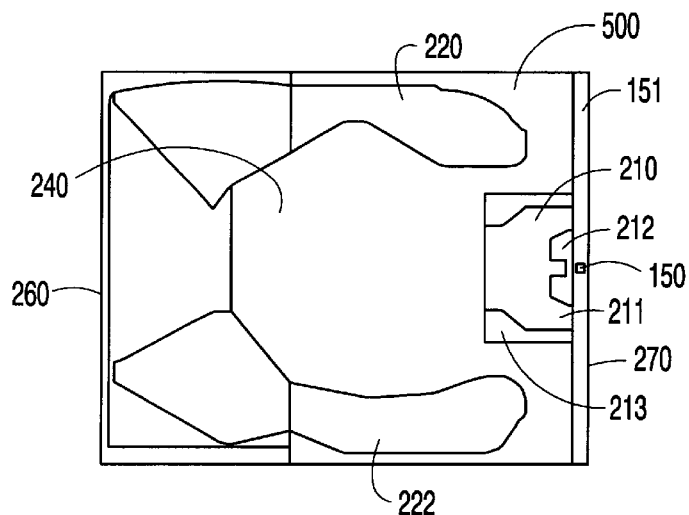
FIG. 2 is a bottom view of a slider of the present invention where the air-bearing surface of the slider includes a single center rail.

FIG. 2 is a bottom view of a slider 126 of the present invention. The slider 126 includes an air-bearing surface. The air-bearing surface is at least partially formed from surfaces on a single center pad 210, a first side rail 220 and a second side rail 222. A single-level cavity 240 is formed between the side rails 220 and 222 as well as the center rail 210. The slider 126 also has a leading edge 260 and a trailing edge 270. The transducer 150 is positioned at or near the trailing edge 270 and is encapsulated within a layer 151 of material, such as alumina, within the center rail 210. ". . . center rail 210, Layer 151 is also called the overcoat layer."

Figure 3:
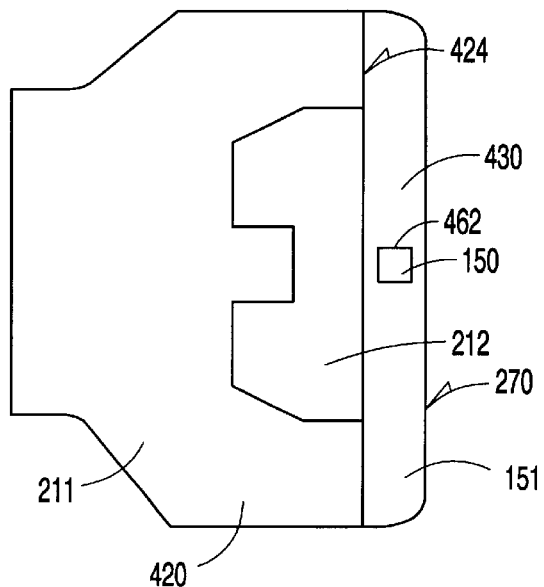
FIG. 3 is a bottom view of the single center rail in the slider shown in FIG. 2

Referring also to FIG. 3, the center rail 210 includes a stepped portion 211 and a raised surface 212 extending from the stepped portion 211. The stepped portion 211 and the raised surface 212 can have any configuration that facilitates aerodynamic travel of the slider 126 over the disc 134. The center rail 210 includes a filler 213, or island, of material that is inserted into a cavity 214 within the substrate 500 of the slider 126 during fabrication of the slider 126.

Figure 4:
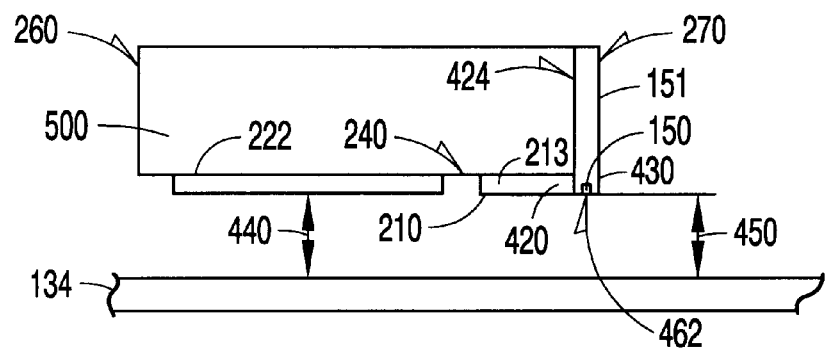
FIG. 4 is a schematic side view of the slider shown in FIG. 2.
Figure 5:
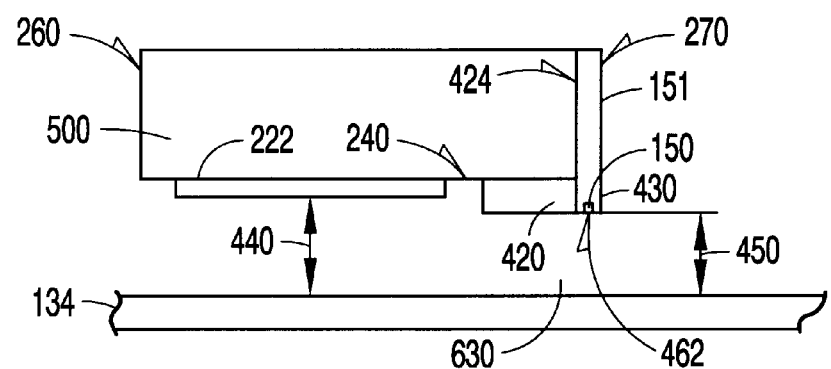
FIG. 5 is a view similar to FIG. 4 illustrating the slider during operation of the disc drive.

Referring also to FIGS. 4 and 5, which are side schematic views of the slider shown in FIG. 2, the center rail 210 includes a front portion 420 and a rear portion 430. The front portion 420 of the center rail 210 is part of the filler 213 material that is inserted into the cavity 214 in the substrate 500 of the slider 126, although the front portion 420 could be formed from both the filler 213 and the substrate 500 depending on the size of the filler 213 and the center rail 210. Although not shown in attached FIGS., the filler 213 may extend through the entire height of the slider 126. The substrate 500 of the slider 126 is typically made of a ceramic material. The rear portion 430 of the center rail 210 is comprised of a material that is different than the substrate 500. The rear portion 430 of the center rail 210 is part of a layer 151 that is formed at the rear end of the slider 126. There is an alumina-substrate interface 424 located between the substrate 500 and the layer 151 of alumina.

The transducer 150 is placed on the back edge of the slider 126 and includes a pole tip 462. Once the basic structure of the transducer 150 is formed on the slider 126 during the fabrication process, it is encapsulated within the layer 151 of alumina. The layer 151 of alumina, or some other suitable material, encapsulates most of the transducer 150 and positions the pole tip 462 at the lower edge of the second portion 430 on the center rail 210.

Although not visible in FIGS. 4 and 5, the slider 126 is slightly tilted with respect to the disc 134 such that the trailing edge 270 of the slider 126 is more closely spaced to the disc drive 134 than the front edge 260 of the slider 126. Controlling the exact distance between the tip 462 of the transducer 150 and the disc 134 in prior art transducers is difficult due to the different rates of thermal expansion of the layer 151 of alumina that encapsulates the transducer 150 and the substrate 500 of the slider 126. The differing rates of thermal expansion are detrimental to the head/disc interface because it introduces larger variability in fly height. The layer 151 of alumina expands much more than the substrate 500 of the slider 126 that is adjacent to the layer 151 such that the transducer 150 extends below the desired air-bearing surface of the center rail 210. As the pole tip 462 of the transducer 150 moves toward the disc 134, there is an increased chance for head to disc 134 contact. This type of contact may cause a head crash that results in unrecoverable data which is very undesirable in a device that is supposed to store data reliably.

FIG. 4 illustrates a slider 126 of the present invention when the slider 126 is not operating. The slider 126 is at ambient temperature and the distance between the side rails 220, 222 and the center rail 210 on the slider 126 and the disc 134 is substantially uniform along the slider 126. More specifically, the distance 440 between the side rails 220, 222 and the disc 134 is substantially the same as the distance 450 between the front and rear portions 420, 430 of the center rail 210 and the disc 134.

The effects of the temperature changes that occur within the slider 126 during operation of the disc drive are shown in FIG. 5. The layer 151 of alumina expands extending the rear portion 430 of the center rail 210 toward the disc 134. The rear portion 430, which includes the tip 462 of the transducer 150, moves below the original air-bearing surface level of the center rail 210. The filler 213 that is part of the front portion 420 of the center rail 210 also expands so that the tip 462 of the transducer 150 does not extend below the rest of the now thermally expanded center rail 210. More specifically, the distance 440 between the side rails 220, 222 and the disc 134 is greater than the distance 450 between both the front and rear portions 420, 430 of the center rail 210 and the disc 134.

The filler 213 of material is preferably, although not necessarily, the same as layer 151 of material that encapsulates the transducer 150. Some preferred materials for the filler 213 are alumina, metals or silicon oxide. Since the filler 213 expands in conjunction with the layer 151 of alumina, the air-bearing surface of the slider 126 adjusts in order to maintain a consistent fly height for the slider 126 during operation of disc drive.

Figure 6:
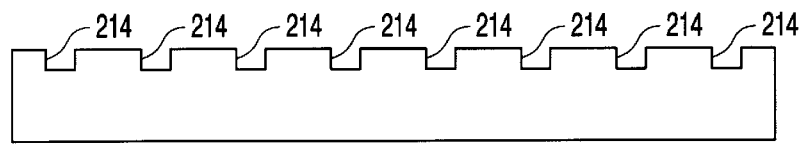
FIG. 6 is a schematic side view of a substrate that includes cavities.
Figure 7:
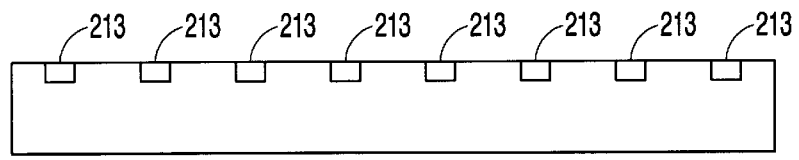
FIG. 7 is a schematic side view of the substrate shown in FIG. 6 with each of the cavities filled with fillers.
Figure 8:
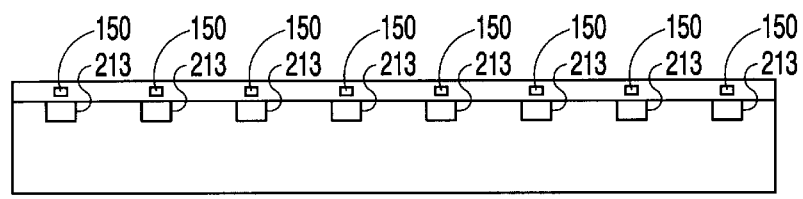
FIG. 8 is a schematic side view of the substrate shown in FIG. 7 with transducers encapsulated within a layer on the substrate such that the transducers are at least partially near the fillers.

One form of the method of the present invention is illustrated in FIGS. 6–8. The method includes providing a substrate 500, such as a ceramic, and forming cavities 214 within the substrate 500 (FIG. 6). The cavities are preferably, although not necessarily, formed by etching the substrate 500. Once the cavities 504 are formed in the substrate 500, the cavities are filled to form the fillers 213 in the substrate 500 (FIG. 7). The substrate 500 is then planarized until the fillers 213 are individualized. Any type of known transducer 150 is then fabricated at least partially near one or more of the fillers 213 within the substrate 500 (FIG. 8). As stated previously, the transducers 150 may be encapsulated in a layer 151 of alumina, or some other suitable material, that is placed on the substrate 500.

The fillers 213 may have any shape and it should noted that additional lapping and/or etching may be needed to expose the fillers 213 during final fabrication processes necessary to form the slider 126. The addition of the filler 213 to the slider 126 drastically reduces the amount of fly height variation due to the differing rates of thermal expansion for the various parts of the slider 126.

In some instances, a transducer may be placed on the trailing surface of an extended side rail 220, 222 such that the transducer is associated with each of the trailing surfaces on one or both of the side rails 220, 222. As a result, the cavity 214 may not necessarily be centered on the trailing edge and there may be more than one cavity to be filled associated with a particular slider air bearing surface geometry.

Figure 9:
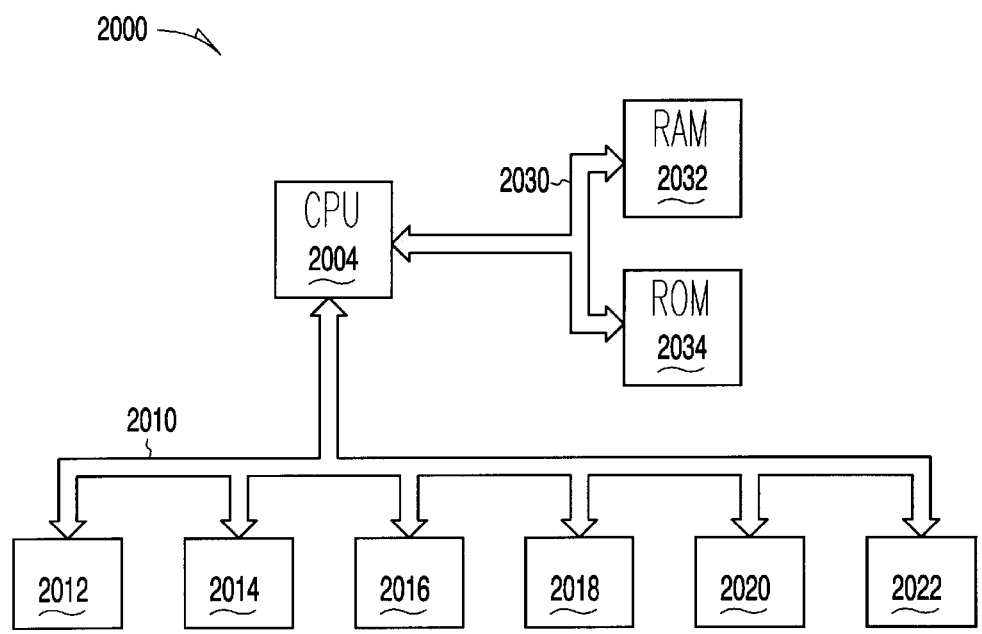
FIG. 9 is a schematic view of a computer system.

FIG. 9 is a schematic view of a computer system 2000. Advantageously, the invention is well suited for use in a computer system 2000. The computer system 2000 may also be called an electronic system or an information handling system, and includes a central processing unit, a memory and a system bus. The information handling system includes a central processing unit 2004, a random access memory 2032, and a system bus 2030 for communicatively coupling the central processing unit 2004 and the random access memory 2032. The information handling system 2000 includes a disc drive device that includes the slider 126 described above. The information handling system 2000 may also include an input/output bus 2010 and several peripheral devices, such as 2012, 2014, 2016, 2018, 2020, and 2022 that may be attached to the input output bus 2010. Peripheral devices may include hard disc drives, magneto optical drives, floppy disc drives, monitors, keyboards and other such peripherals. Any type of disc drive may use the slider discussed above.

The slider 126 and method of the present invention both include, or ". . . form, a cavity 240 within . . ." a substrate 500. The cavity 214 is filled with a filler 213 of material that is similar to the material of the transducer 150. The design facilitates controlling the relative thermal expansion between a layer 151 that encapsulates the transducer 150 and the substrate 500 of the slider 126. Compensating for the thermal expansion of the transducer 150 provides a more consistent fly height of the slider 126 during operation of the disc drive. In addition, the design adjusts the air-bearing surface of the slider 126 such that the tip 462 of the transducer 150 does not extend below the air-bearing surface of the slider 126 as the transducer 150 expands. The result is more consistent read and write performance characteristics amongst the heads in a disc drive as well as a design that is less sensitive to the differences in thermal expansion that exist between the substrate 500 and the transducer 150 of the slider 126.

In conclusion, the present invention relates to a slider 126 for a disc drive. The slider 126 includes a substrate 500 ". . . having a cavity 240 and a filler 213 within the cavity 240." The slider 126 further includes a transducer 150 that is positioned near the filler 213. The slider 126 may further include a leading and a trailing edge 260, 270 and a center rail 210 that is positioned near the trailing edge 270 of the slider 126. The substrate 500 is preferably ceramic and the center rail 210 may include a part of the substrate 500. The center rail 210 preferably includes a rear portion 430 that forms part of the trailing edge 270 of the slider 126. The rear portion 430 of the center rail 210 may substantially encapsulate the transducer 150. The filler 213 is preferably alumina and/or the same material as the layer 151 that encapsulates the transducer 150, and is positioned adjacent to the rear portion 430 of the center rail 210 such that filler 213 expands with the layer 151 of alumina. The slider 126 may further include a first side rail 220 located between the leading edge 260 and the trailing edge 270 of the slider 126 and a second side rail 222 located between the leading edge 260 and the trailing edge 270. The dimensions of the filler 213 control the amount of movement between the substrate 500 and the transducer 150 due to different rates of thermal expansion of the substrate 500 and the transducer 150 during operation of slider 126.

The present invention also relates to a method of fabricating a slider. The method includes providing a substrate 500 and forming a cavity 214 in the substrate 500. The cavity 214 is filled with a filler 213 and a transducer 150 is formed on the slider 126 such that the transducer 150 is positioned near the filler 213. The step of forming a cavity 214 in the substrate 500 may include etching the cavity 214 into the substrate 500, and the step of forming a transducer 150 near the filler 213 may include encapsulating the transducer 150 within a layer 151 on the substrate 500.

The present invention generally relates to a slider 126 for a disc drive information handling system. The slider 126 includes a transducer 150 and a means for controlling the amount of fly height variance associated with the slider 126 due to the thermal expansion of the transducer 150 during operation of the disc drive. The means for controlling the amount of fly height variance may include a filler 213 within the substrate 500 such that the filler 213 is positioned near the transducer 150.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A slider for a disc drive information handling system, the slider comprising:
   (a) a transducer; and
   (b) means for controlling the amount of fly height variance associated with operating the slider due to the thermal expansion of a transducer within the slider.

2. The slider of claim 1 wherein the means for controlling the amount of fly height variance includes a filer within a substrate, the filler being positioned near the transducer.

3. The slider of claim 1 wherein the transducer is encapsulated within a layer on the substrate.

4. The slider of claim 1, wherein the transducer is within a center rail.

5. The slider of claim 4, wherein the slider includes a leading and a trailing edge such that the center rail is positioned near the trailing edge of the slider.

6. The slider of claim 5, wherein the center rail includes a part of the substrate portion.

7. The slider of claim 5, wherein the center rail further includes a rear portion covering the trailing edge of the slider.

8. The slider of claim 7, wherein the means for controlling the amount of fly height variance is adjacent to the rear portion of the center rail.

9. The slider of claim 8, wherein the means for controlling the amount of fly height variance is the same material as the rear portion of the center rail.

10. The slider of claim 2, wherein the dimensions of the means for controlling the amount of fly height variance controls the amount of movement between the substrate and the transducer due to different rates of thermal expansion of the substrate and the transducer during operation of the slider.

11. A slider comprising:
    a plurality of materials;
    a transducer positioned in the plurality of materials; and
    means for controlling the amount of fly height variance due to a thermal expansion of the plurality of materials in relation to a thermal expansion of the transducer.

12. The slider of claim 11 wherein the plurality of materials includes a substrate and a overcoat layer, further wherein the transducer is encapsulated within a layer on the overcoat layer.

13. The slider of claim 11, wherein the transducer is within a center rail.

14. The slider of claim 13, wherein the slider includes a leading and a trailing edge such that a center rail is positioned near the trailing edge of the slider.

15. The slider of claim 14, wherein the means for controlling the amount of fly height variance is adjacent to the rear portion of the center rail.

16. The slider of claim 14, wherein the means for controlling the amount of fly height variance is the same material as the rear portion of the center rail.

17. A slider comprising:
    a substrate;
    a overcoat layer positioned proximate the substrate; and
    means for controlling the amount of fly height variance due to a thermal expansion of the substrate in relation to the thermal expansion of the overcoat layer.

18. The slider of claim 17 wherein a transducer is positioned within the overcoat layer.

19. The slider of claim 17, wherein the means for controlling the amount of fly height variance is composed of the same material as the material of the overcoat layer.

20. The slider of claim 17, wherein the overcoat layer is composed of alumina.

21. The slider of claim 17, wherein the means for controlling the mount of fly height variance is selected from the group consisting of alumina, metal, or silicon oxide.

* * * * *